April 3, 1945. V. E. STEVENS 2,373,065
CONTROL APPARATUS FOR AIRCRAFT
Filed Nov. 17, 1941
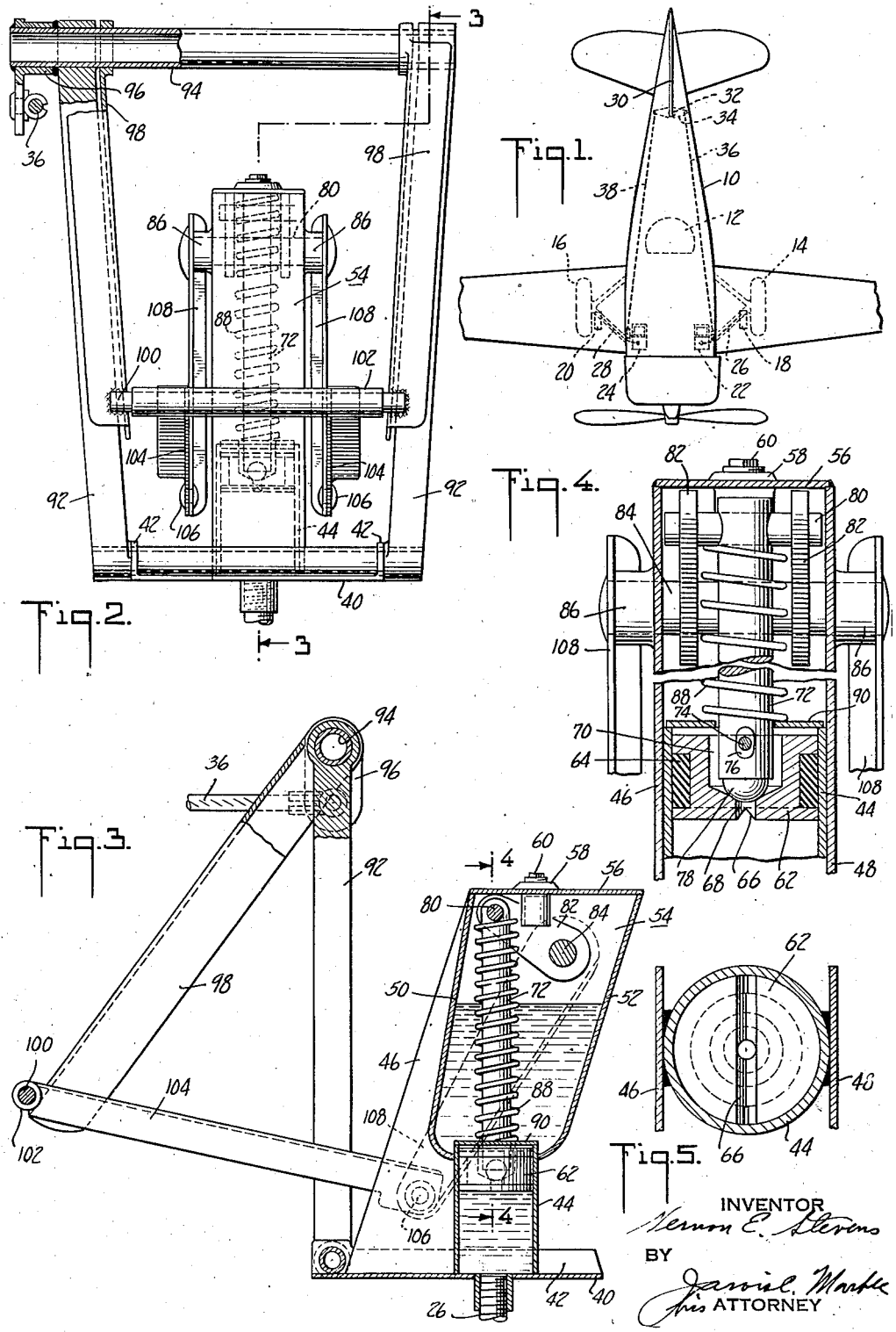

Patented Apr. 3, 1945

2,373,065

UNITED STATES PATENT OFFICE 2,373,065

CONTROL APPARATUS FOR AIRCRAFT

Vernon E. Stevens, Wellsville, N. Y.

Application November 17, 1941, Serial No. 419,415

6 Claims. (Cl. 244—86)

My invention relates to control apparatus and more particularly to such apparatus for use in an aircraft and still more particularly to a combined foot operated landing wheel brake and rudder control. Still more particularly the invention relates to such apparatus embodying hydraulically actuated brake mechanism.

It is customary to control the operation of the rudder on an airplane by means of a pair of pedals connected to the rudder by means of cables or the like. These pedals are arranged to be operated by the feet of the pilot, pressure upon the right pedal exerted by the right foot effecting turning of the airplane to the right, and pressure on the other pedal by the left foot causing turning to the left. It is also customary to provide independently operated brakes for the two landing wheels in order to enable the pilot to steer the plane while taxiing on the ground by producing more braking effect on one wheel than on the other. Thus, application of the brake on the right wheel causes the plane to turn to the right. In order for separate control to be possible, two brake pedals are required.

In accordance with prior practice the two rudder control pedals have been mounted in line with, but above, the two brake pedals. This has the disadvantage of not only requiring the pilot to maintain his legs more or less suspended over the brake pedals in order to have his feet on the rudder control pedals during flight, but it has made it impossible to simultaneously manipulate both the rudder control pedals and the brake pedals, as is sometimes required in order to execute a necessary sharp turn while on the ground.

In accordance with my invention I combine one rudder control pedal and one brake pedal in a single pedal assembly so constructed and arranged that the rudder is under the control of the pilot's toe, while the brake is actuated by the heel. The construction is further such that either brake or rudder control may easily and conveniently be actuated by the pilot without shifting the position of his foot relative to the assembly and without the actuation of either control affecting the other. Likewise, without shifting foot position both may be actuated simultaneously and each to the desired degree. Moreover, during flight when actuation of the brakes is immaterial, the pilot may use the portion of the pedal assembly which controls the brakes as a foot rest, thus making it possible for his legs to assume a restful position during flight.

Another object of my invention is to provide an improved master brake cylinder combined with the above described pedal assembly.

Further objects and advantages of my invention will be apparent from the following description considered in connection with the accompanying drawing which forms a part of this specification and of which:

Fig. 1 is a more or less diagrammatic top view of an aircraft embodying my invention;

Fig. 2 is a front view of the combined pedal assembly and master cylinder;

Fig. 3 is a cross-sectional view taken on the line 3—3 of Fig. 2;

Fig. 4 is a cross-sectional view on a large scale taken on the line 4—4 of Fig. 3; and Fig. 5 is a cross-sectional view taken on the line 5—5 of Fig. 4.

Referring more particularly to Fig. 1, reference character 10 designates generally a single seater aircraft provided with a seat 12 for the pilot. The airplane is provided with a pair of landing wheels 14 and 16, associated with each of which is a brake cylinder 18 and 20. Located within the fuselage and in front of the seat 12 is a pair of pedal assemblies 22 and 24, each including a master brake cylinder. The master cylinder in the assembly 22 is connected to the brake cylinder 18 by means of a suitable pressure conveying conduit 26, while the master cylinder in the other pedal assembly is connected to the brake cylinder 20 by means of a similar conduit 28.

The airplane is provided with the usual rudder 30 pivoted about a vertical axis 32 and connected to a rudder bar 34. One end of the rudder bar is connected to the pedal assembly 22 by means of the cable 36, while the other end of the bar is connected to the pedal assembly 24 by means of the cable 38.

Thus, when the pilot manipulates the left pedal assembly 22 so as to place the cable 36 under tension the rudder is pivoted in clockwise direction as viewed from above in Fig. 1, so as to cause the ship to turn to the left. Manipulation of the pedal assembly 22 so as to actuate its master brake cylinder, results in a braking effect being produced on the left landing wheel 14, which if the plane is taxiing on the ground, will cause it to turn to the left. Similar operation of the pedal assembly 24 causes the ship to turn to the right. As will be described hereinafter, the pedal assemblies may be operated so as to effect rudder and brake action independently of each other, or simultaneously.

The pedal assembly is shown in detail in Figs.

2 through 5, which show the assembly which is under control of the pilot's left foot.

Reference character 40 designates a base plate which is secured to the floor of the pilot's compartment and is formed with vertical flanges 42 on either side. Secured to plate 40, as by welding, is a master brake cylinder 44. The plate 40 is formed with an opening communicating with the lower end of the cylinder, to which is connected the conduit 26 which leads to the brake cylinder associated with the landing wheel 14.

Welded to the base plate 40 on either side of the cylinder 44 are upwardly extending walls 46 and 48. Disposed between these walls are transverse walls 50 and 52 which at their lower ends are welded to the upper end of the cylinder 44. As is shown more particularly in Fig. 5, the walls 46 and 48 are also welded to the cylinder and there is thus provided a reservoir designated generally by reference character 54 which communicates with the upper end of the brake cylinder. The upper end of the reservoir is closed by means of a cover plate 56 which is welded to the vertical walls of the reservoir and is provided with a filler opening 58 normally closed by means of a threaded plug 60.

Reciprocably mounted within the cylinder 44 is a piston or plunger 62, shown more particularly in Figs. 4 and 5. This piston is formed with an annular groove in which is located a packing ring 64 of suitable yieldable material, such as a synthetic rubber. A V-shaped channel 66 extends diametrally across the lower face of the piston and is cut deep enough so that it extends completely through the lower flange portion of the piston which defines the lower edge of the annular channel in which is received the packing 64. The piston 62 is formed with a central passageway 68 which communicates at its lower end with the mid-point of the V-shaped groove 66 and at its upper end with an enlarged space 70 within the piston. The lower end of a piston rod 72 is loosely secured within the space 70 by means of a transverse pin 74 which is rigidly secured to the piston and extends through a vertically elongated slot 76 in the piston rod, thus permitting limited relative vertical movement between the piston and the rod. The lower end of the rod is formed as a valve member 78 which, when the rod is moved downwardly relative to the piston, seats on the bottom of recess 70 so as to prevent flow through the passageway 68.

Rigidly secured to the upper end of the piston rod 72 is a transverse pin 80 pivotally connected to a pair of arms 82 which are rigidly connected to a shaft 84 which extends through the walls 46 and 48 of the reservoir and is journalled in bosses 86 which are provided with suitable fluid tight packings. A coil spring 88 encircles the piston rod 72 and is compressed between the pin 80 and a washer 90 resting on the upper end of the brake cylinder 44. The washer 90 is provided with a central aperture through which the piston rod extends with ample clearance to permit flow of fluid between the rod and the washer.

Pivoted at either side of the base plate 40 is a pair of upwardly extending levers 92. As shown more particularly in Fig. 2, these levers diverge somewhat from each other and at their upper ends are rigidly connected to a preferably hollow tube 94. This tube overhangs the left hand lever 92, as viewed in Fig. 2, and has rigidly secured thereto a member 96 to which is secured the rudder control cable 36. The tube 94 is to be contacted by the toe of the pilot's left foot and the application of pressure by the toe causes the lever 92 to pivot in a clockwise direction, as seen in Fig. 3, so as to transmit tension through the cable 36 to thus pivot the rudder 30 in the proper direction to cause a left turn.

A pair of levers 98 are pivoted at their upper ends on the tube 94 and are rigidly connected at their lower ends by means of a transverse pin or bar 100. A sleeve 102 is rotatably mounted on the pin 100 and a pair of links 104 are secured thereto, preferably by welding. The opposite end of each link is pivotally connected at 106 to lever arms 108 which are rigidly secured to either end of the shaft 84 outside of the reservoir 54.

The pin 100 and sleeve 102 are so located that the pilot may place his heel thereagainst while his toe rests on the tube 94. Application of pressure by the heel with the foot as a whole pivoting about the rod 94 as a fulcrum, causes the levers 98 to pivot in a similar manner. Thus, the links 104 cause the levers 108 to pivot in a counterclockwise direction, as viewed in Fig. 3. For any given position of the rudder levers 92, the levers 98 serve to restrain movement of links 104 to a direction substantially parallel to themselves, and thus prevent pressure applied by the heel from merely pivoting the links about the connections 106 without pivoting the levers 108. Hence, the levers 98 constitute a linkage for imposing substantially parallel motion to the links 104 when force is applied to the ends thereof by the heel for applying the brake. Pivoting of the levers 108 in turn causes the shaft 84 and the levers 82 to pivot in the same direction, with the result that the piston rod 72 is moved downwardly against the force of the spring 88. The cylinder 44 underneath the piston 62 is maintained full of a suitable brake fluid and consequently there is resistance to downward movement of the piston. Consequently, the piston rod first moves downwardly without moving the piston until the valve member 78 seats against the bottom of the recess 70. This not only closes the passageway 68, but also provides for a direct path of force transmission from the rod to the piston, thus causing the piston to move downardly with the rod. This imposes a pressure on the fluid in the brake cylinder and, inasmuch as this fluid is substantially non-compressible, fluid pressure is transmitted through the conduit 26 to the brake cylinder 18, thus braking the left landing wheel 14.

When the pilot relieves the pressure applied by his heel to the pin 100, the spring 88 causes the levers 82 to pivot in a clockwise direction as viewed in Fig. 3, thus lifting the piston rod 72. The pressure of the brake fluid causes the piston to at first follow the rod, but as soon as this pressure is relieved the rod moves upwardly with respect to the piston, thus unseating the valve 78 and opening the passageway 68. Consequently, brake fluid from the reservoir 54 may flow into the brake cylinder so as to assure that it is at all times maintained completely full of liquid. Should any air get into the brake line at any point, it will pass upwardly into the master cylinder 44, and will be led by the V-shaped groove 66 to the passageway 68, through which it will pass to the reservoir and be replaced by liquid.

Due to the fact that the groove 66 is cut deep enough to extend through the lower flange of the piston, when the piston is forced downwardly as above described to apply pressure to the fluid in the cylinder, the fluid pressure is transmitted to behind the yieldable packing 64, thus tending to force the packing radially outwardly against the brake cylinder wall so as to increase its sealing effect.

If the pilot wishes to obtain the effect of both the rudder and one of the landing wheel brakes in order to execute a sharp turn on the ground, he presses with both his toe and heel on the tube 94 and pin 100, respectively. This causes the lever 92 to pivot so as to transmit tension through the cable 36 to the rudder and at the same time moves the link 104 so as to move the piston 62 downwardly within the master cylinder. Thus the rudder 30 is pivoted in a clockwise direction, as viewed in Fig. 1 and the left wheel is braked, both of which actions have the effect of causing the ship to turn sharply to the left.

During flight, when it is immaterial if the brakes are applied, the pilot may rest his heel on the pin 100 in order to utilize it as a foot rest, while maintaining his toe in contact with the tube 94. He is thus in a position to steer the ship by applying pressure with the toe of either foot to the tube 94 of the proper pedal assembly.

As above stated, the pedal assembly which has been described is that designated by reference character 22 in Fig. 1, that is the assembly which controls the brake for the left wheel 14. The pedal assembly 24 is the same as that described, except that the member 96 to which the rudder control is connected, is secured to the other end of the tube 94.

It will thus be seen that I have provided a unitary assembly of a master brake cylinder and foot operated means for controlling it either simultaneously with or independently of the rudder. While I have shown and described one more or less specific embodiment of my invention, it is to be understood that this has been done for the purpose of illustration only, and that the scope of my invention is not to be limited thereby, but is to be determined from the appended claims.

What I claim is:

1. In a combined foot operated landing wheel brake and rudder control for an aircraft, a first lever pivoted about a fixed fulcrum, a rudder cable, means for connecting said cable to said lever at a point spaced from said fulcrum, said lever being so located in said aircraft as to be pivoted by the toe of the pilot, a second lever pivotally connected to said first lever and extending downwardly so that the lower end is positioned beneath the heel of the pilot, brake actuating means, and means operatively connecting the lower end of said second lever to the last-mentioned means.

2. In a combined foot operated landing wheel brake and rudder control for an aircraft, a first lever pivoted adjacent to its lower end about a fixed pivot point, said lever being so located in said aircraft that the upper end of the lever may be contacted by the pilot's toe, a rudder cable, means for connecting said cable adjacent to the upper end of said lever, a second lever pivotally connected to the upper end of said first lever and extending downwardly so that the lower end is positioned beneath the heel of the pilot, brake actuating means, and means operatively connecting the lower end of said second lever to the last-mentioned means.

3. In a combined foot operated landing wheel brake and rudder control for an aircraft, a first lever assembly including a pair of spaced levers pivoted adjacent to their lower ends about a fixed axis and a transverse member connecting the upper ends of said levers together, said lever assembly being so located in the aircraft that said member may be contacted by the pilot's toe, a rudder cable, means for connecting said cable adjacent to the upper end of said first lever assembly, a second lever assembly including a pair of spaced levers having their upper ends pivoted on said member and a transverse member connecting the lower ends of said levers, the last-mentioned transverse member being positioned beneath the pilot's heel, brake actuating means, and means operatively connecting the lower end of said second lever assembly to said actuating means.

4. In a combined foot operated landing wheel brake and rudder control for an aircraft, a first lever pivoted adjacent to its lower end about a fixed pivot point, said lever being so located in said aircraft that the upper end of the lever may be contacted by the pilot's toe, a rudder cable, means for connecting said cable adjacent to the upper end of said lever, a second lever pivotally connected to the upper end of said first lever and extending downwardly so that the lower end is positioned beneath the heel of the pilot, brake actuating means, including a third lever pivoted about a fixed pivot point, and a link connecting the lower end of said second lever with said third lever.

5. In a combined foot operated landing wheel brake and rudder control for an aircraft, a first lever assembly including a pair of spaced levers pivoted adjacent to their lower ends about a fixed axis and a transverse member connecting the upper ends of said levers together, said lever assembly being so located in the aircraft that said member may be contacted by the pilot's toe, a rudder cable, means for connecting said cable, adjacent to the upper end of said first lever assembly, a second lever assembly including a pair of spaced levers having their upper ends pivoted on said member and a transverse member connecting the lower ends of said levers, the last-mentioned transverse member being positioned beneath the pilot's heel, brake actuating means including a rotatably mounted shaft, a pair of spaced arms rigidly secured to said shaft, and a pair of links connecting the lower end of said second lever assembly with said arms.

6. In a combined foot operated landing wheel brake and rudder control for an aircraft, a first lever pivoted about a fixed fulcrum, a rudder cable, means for connecting said cable to said lever at a point spaced from said fulcrum, said lever being so located in said aircraft as to be pivoted by the toe of the pilot, a second lever pivoted about a fixed fulcrum spaced from the first-mentioned fulcrum, brake actuating means operatively connected to said second lever, a link pivotally connected at one end to said second lever and having its opposite end positioned beneath the heel of the pilot, and a third lever constituting parallel motion means for restraining movement of said link to a direction substantially parallel to itself when said link is moved by force applied to the end thereof by said heel.

VERNON E. STEVENS.